United States Patent
Vanderhulst

(10) Patent No.: US 10,447,637 B2
(45) Date of Patent: Oct. 15, 2019

(54) METHOD AND PLATFORM FOR SENDING A MESSAGE TO A COMMUNICATION DEVICE ASSOCIATED WITH A MOVING OBJECT

(71) Applicant: Alcatel Lucent, Boulogne Billancourt (FR)

(72) Inventor: Geert Vanderhulst, Aarschot (BE)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 14/915,349

(22) PCT Filed: Aug. 26, 2014

(86) PCT No.: PCT/EP2014/068028
§ 371 (c)(1),
(2) Date: Feb. 29, 2016

(87) PCT Pub. No.: WO2015/028443
PCT Pub. Date: Mar. 5, 2015

(65) Prior Publication Data
US 2016/0219011 A1    Jul. 28, 2016

(30) Foreign Application Priority Data
Aug. 29, 2013  (EP) .................................... 13290202

(51) Int. Cl.
*H04L 12/58* (2006.01)
*H04W 4/029* (2018.01)
(Continued)

(52) U.S. Cl.
CPC ............ *H04L 51/20* (2013.01); *H04W 4/023* (2013.01); *H04W 4/029* (2018.02); *H04W 4/06* (2013.01);
(Continued)

(58) Field of Classification Search
CPC ............ G08B 21/0202; G08B 21/0261; G08B 21/0272; G08B 13/19602;
(Continued)

(56) References Cited

U.S. PATENT DOCUMENTS 5,164,992 A    11/1992  Turk et al.
6,940,545 B1    9/2005  Ray et al.
(Continued)

FOREIGN PATENT DOCUMENTS

CN    102222341 A    10/2011
EP    1 030 188 A1    8/2000
(Continued)

OTHER PUBLICATIONS

Lorena Calavia et al., "A Semantic Autonomous Video Surveillance System for Dense Camera Networks in Smart Cites," Sensors, Vo., 12, No. 12, XP055096503, pp. 10407-10429, 2012.
(Continued)

*Primary Examiner* — Quoc Thai N Vu
(74) *Attorney, Agent, or Firm* — Fay Sharpe LLP

(57) ABSTRACT

To send a message to a communication device (17) associated with a moving object (16) a method comprising several steps is proposed. In a first step, a first location trajectory (3) of this object (16) is obtained by a first party (1). In a second step, this trajectory (3) is sent (9) from this first party (1) to a second party (2). Then, the second party (2) obtains (8) a set of second location trajectories (6) of tracked communication devices (19) and compares the first location trajectory (3) with this set. Next, the second party (2) selects a selected location trajectory (5) of a selected communication device (17) from the set if this selected location trajectory (5) is substantially the same as the first location trajectory (3). This selected communication device (5) corresponds to the com-
(Continued)

munication device (5). At the end, the message is sent to the selected communication device (5) by the second party (2).

10 Claims, 1 Drawing Sheet

(51) Int. Cl.
  *H04W 4/06* (2009.01)
  *H04W 4/02* (2018.01)
  *H04W 4/12* (2009.01)
  *H04W 4/38* (2018.01)
(52) U.S. Cl.
  CPC ............... *H04W 4/12* (2013.01); *H04W 4/02* (2013.01); *H04W 4/38* (2018.02)
(58) Field of Classification Search
  CPC ........ G08B 13/19608; G08B 13/19641; G08B 21/0263; G08B 21/0266; H04W 64/00; H04W 4/023; H04W 4/028; H04W 4/06; H04W 4/12; H04W 4/006; H04W 4/02; G06T 7/2093; H04L 51/20
  See application file for complete search history.

(56) References Cited

U.S. PATENT DOCUMENTS

| | | | |
|---|---|---|---|
| 7,397,773 B2 | 7/2008 | Qu et al. | |
| 8,010,164 B1 | 8/2011 | Sennett et al. | |
| 2003/0013466 A1 | 1/2003 | Ahn | |
| 2004/0130620 A1* | 7/2004 | Buehler | G06K 9/00335 348/143 |
| 2010/0075626 A1* | 3/2010 | Titus | H04W 76/007 455/404.1 |
| 2013/0155229 A1* | 6/2013 | Thornton | H04N 7/18 348/143 |
| 2014/0018976 A1* | 1/2014 | Goossen | G06F 17/00 701/2 |
| 2014/0361899 A1* | 12/2014 | Layson | G08B 21/18 340/573.4 |

FOREIGN PATENT DOCUMENTS

| | | |
|---|---|---|
| JP | 2004-096501 | 3/2004 |
| JP | 2013-507014 | 2/2013 |
| JP | 2013-038721 | 7/2013 |
| JP | 2014-516441 | 7/2014 |
| WO | WO 2004/045215 A1 | 5/2004 |
| WO | WO 2012/143301 | 10/2012 |
| WO | WO 2013/103782 A1 | 7/2013 |

OTHER PUBLICATIONS

International Search Report for PCT/EP2014/068028 dated Oct. 30, 2014.

* cited by examiner

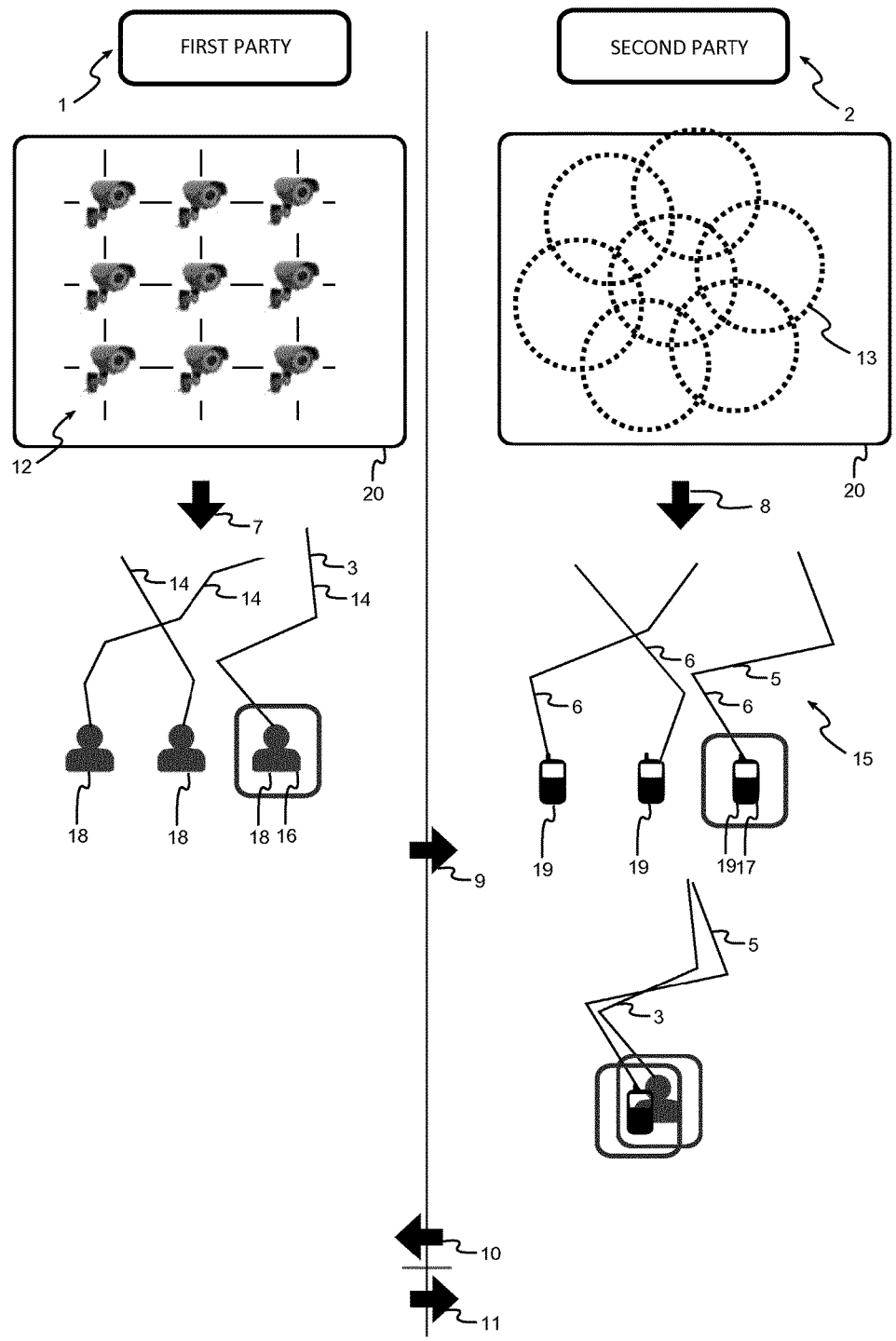

METHOD AND PLATFORM FOR SENDING A MESSAGE TO A COMMUNICATION DEVICE ASSOCIATED WITH A MOVING OBJECT

FIELD OF THE INVENTION

The present invention generally relates to the identification of a communication device associated with a moving object. It further relates to the delivery of a message to the identified communication device. The communication device may be a mobile phone, smartphone or tablet carried by a person who is moving around, for example by foot, bike or car. The moving object may also be the mechanical device itself such as a car or any other moving equipment. The communication device may then be part of the mechanical device, for example an on-board computer equipped with a SIM card and thus functionalities for mobile communication.

BACKGROUND OF THE INVENTION

Surveillance systems or other monitoring systems allow to identify people and objects in a surveyed or monitored area. In some situations, it may be desirable to send a message, for example an SMS, to the mobile device of an observed person who is walking around in the area. Such a situation may occur when a person left behind a personal object or when people should be warned about a dangerous situation in the direction they are heading to, e.g. a sudden manifestation or hooliganism. It may also be desirable to send a message to a communication device installed in a car or any other vehicle, for example to the on-board computer of a car equipped with cellular functionality. The problem in these situations is to retrieve the identification of the communication device such as for example the phone number or email address.

Several solutions exist for identifying and sending messages to mobile and communication devices in such situations. A first solution proposed in US20030013466A1 is by using cell broadcasts, designed for simultaneous delivery of a message to multiple users in a specified area. In other words, an operator can send a text message to all users within reach of a particular cell tower and thus a particular area. A disadvantage however is that there are no means to distinguish between people or objects, for example, based on their moving trajectories. A further disadvantage is that the broadcast perimeter and, hence, the accuracy of addressing specific persons largely depends on the number and range of available radio beacons covering an area.

Another solution uses public cameras in combination with face recognition algorithms to identify persons. The system then looks up a mobile phone number associated with a person in a database and sends a text message to the targeted person or persons. A disadvantage of this solution is that the personal details like the phone number, photo and name of the persons have to be known to the monitoring or surveying system, compromising the privacy of the persons. A further disadvantage of this solution is that it is only applicable for persons and objects that can be identified through a camera, e.g. requiring that the face of a person or the license plate of a car is clearly visible in camera feeds which is not always the case.

SUMMARY OF THE INVENTION

It is an object of the present invention to overcome the above disadvantages by providing a method for sending a message to a communication device associated with a moving object, the method comprises several steps. In a first step, a first party obtains a first location trajectory of the moving object and sends it to a second party. This second party obtains a set of second location trajectories of tracked communication devices and compares the first location trajectory with location trajectories from this set. The second party then selects a selected location trajectory of a selected communication device from the set if the selected location trajectory is substantially the same as the first location trajectory. Finally, the second party sends the message to the selected communication device.

An object may be a person that is walking around while carrying a mobile communication device such as for example a phone, smartphone, tablet or portable computer. In this case, the first location trajectory comprises the path this person has walked within a certain time interval. An object may also be a physical object such as a car or bicycle carrying a person and his mobile communication device. A first location trajectory is then defined by the path of the physical object rather than the path defined by the person. The communication device may also be attached to the moving object. For example, a car may be equipped with an on board communication module using cellular or other wireless communication means. In this sense, the term "associated with" means that the communication device and the moving object travel substantially the same location trajectory in the observed time interval wherein the first location trajectory is obtained. The selected location trajectory is then the path of the communication device associated with the moving object during that same time interval. The set of second location trajectories are then location trajectories of communication devices that are located in the same area as the area observed by the first party. While the first party gathers information on the position of the moving objects, the second party gathers information on the position of the communication devices associated with the moving objects. The second party also comprises the means to retrieve the addressing information of the tracked communication devices so that it can send the message to the selected communication device.

Due to the differences in accuracy of the localization techniques used by the two parties, the first and the selected location trajectories may differ from a few centimeters to several meters or more. Therefore, substantially the same should be interpreted as such that the selected trajectory resembles most the first trajectory from the set of second trajectories. To decide this, a heuristic algorithm may for example be used that decides that two trails are e.g. 80% similar and hence are considered to be substantially the same. The ability of the algorithm to detect a proper match will depend on the number of similar trajectories in a given period as related to the number of moving objects.

It is an advantage that no personal information such as a phone number, picture or address is needed by the first party about a person or communication device to actually identify the person as the identification is purely done by the location trajectory. The privacy of the user or owner of the communication device is thus safeguarded, as the first and second party do not exchange any information with respect to the identity of the user or her device.

As a location trajectory is used for the identification of an object, the method is not restricted to the addressing of mobile devices carried by people as it is the case when using facial recognition algorithms. Every moving object may be addressed as long as it has an associated communication device.

Optionally the method may comprise the following additional steps:

notifying by the second party to the first party that the first and selected location trajectory is substantially the same;

creating the message by the first party; and sending the first message from the first party to the second party.

This way the first party knows if a message can be addressed by the second party to the communication device associated with the moving object. This allows the first party to use alternative options for the delivery of the message. For example by sending the first location trajectory to a third party that offers the same functionality as the second party but by a different technology.

According to a preferred embodiment the first location trajectory comprises first location points, each comprising a position of the moving object at a certain moment in time. Each one of the set of second location trajectories comprise second location points, each comprising a position of one of the tracked communication devices at a certain moment in time.

This allows to define a location trajectory by a simple set of points as a function of time making the exchange of the location trajectory simple and straightforward.

Preferably, the second party operates a wireless communication network comprising network cells. The tracked communication devices are then detectable by said network cells.

This wireless communication network may for example be a Wireless LAN (WLAN), a Zigbee network or a cellular network such as a GSM, UMTS, LTE, 3G, 4G or any other cellular network. These wireless networks divide the zone that comprise the first location trajectory in overlapping network cells. As the communication device is thus located inside one of the network cells, the message can be addressed to the communication device identified and is thus known to the wireless communication network. The message may then for example be formatted as an SMS, an MMS or email.

As the second party operates a wireless communication network, it may easily retrieve addressing information for the communication device in order to send the message to this device.

According to an embodiment, the obtaining the second location points comprises, for a tracked communication device, calculating a position of the tracked communication device within the network cells by using localization techniques offered by the wireless communication network.

This allows an easy implementation of the above method as no extra hardware is needed for the localization of the tracked communication devices. Most wireless communication networks already have built-in capabilities for the localization of communication devices connected to the network.

One example of such a localization technique is cell triangulation supported by most wireless communication networks and wireless communication devices. Receiving the signal of a network node (e.g. cell tower or WiFi access point) whose position and cell coverage area is known, provides a coarse location estimate. Several techniques can also be used to estimate the distance between a communication device and a wireless network node, such as measuring the signal strength, round-trip time of a packet or angle of arrival. Combining localization information from multiple cells typically leads to an increasingly accurate location estimate.

Alternatively the second party may also operate a location-based service receiving location coordinates from communication devices of subscribed users. By the subscription of the users, the address information for addressing the message is known to the second party. The second location is then registered by the communication device itself for example by a mobile application installed on the user's communication device. The obtaining of second location points may then be done by a GPS module comprised in the communication device. The second location trajectory is then sent as a series of GPS coordinates together with time-stamps to the second party.

According to a further preferred embodiment the first location trajectory is obtained from a camera grid used to track the moving object.

Camera grids are typically used in safety and monitoring applications and may cover large areas such as streets, market places, cities or areas where events are organized. Such a camera grid may obtain a set of location trajectories of all persons or objects moving in the surveyed or monitored area. A person or algorithm may then select a person or object to whom a message should be addressed. The location trajectory of this person or object obtained from the camera grid then corresponds to the first location trajectory.

The present invention also relates to a platform operated by the second party. This platform is adapted to perform the steps by the second party of the method above.

Similarly, the invention also relates to a platform operated by the first party. This platform is adapted to perform the steps by the first party of the method above.

It should be noted that the first and second party may be the same. For example, an operator of a wireless communication network may also operate a camera grid, identify a moving object from the camera grid by a location trajectory and address a message to the communication device over its wireless communication network.

BRIEF DESCRIPTION OF THE DRAWINGS

FIG. 1 illustrates the sending of a message to a communication device according to a preferred embodiment of the present invention.

DETAILED DESCRIPTION OF EMBODIMENT(S)

FIG. 1 illustrates the sending of a message to a communication device 17 associated with a moving object 16 according to a preferred embodiment of the present invention. A first party 1 operates a platform comprising a grid of cameras 12 surveying a public area 20. These cameras may be mounted on poles along the streets and buildings or carried by drones and return top-level feeds of people and objects passing by. As the location of these cameras is known as well as the distance between them and their field of view, the location of objects 18 within the view of the camera grid can be calculated. Software analyzing the camera feeds then detects the moving objects 18 and their trajectories 14, which are stored as a set of location coordinates and timestamps. The timestamps indicate at which moment in time the moving object 18 was at a corresponding location coordinate.

Different algorithms are known in the art for obtaining 7 such first location trajectories 14 from a camera feed. One such algorithm is described in "A Camera-based System for Tracking People in Real Time" by Jakub Segen and Sarma Pingali from Bell Laboratories published in Proceedings of the International Conference on Pattern Recognition in 1996. Another such algorithm was described in "Tracking Multiple People with a Multi-camera System" by Ting-Hsun Chang and Shaogang Gong published in the Proceedings of the IEEE Workshop on Multi-Object Tracking in 2001.

These first location trajectories 14 may then be displayed on a monitor of a surveying room where a user, for example an employee of a security company, selects a first location trajectory 3 from these first location trajectories 14 with the intention to have a message delivered to the communication device 19 associated with the moving object. If the moving object is a person, the communication device may for example be a mobile phone, smartphone or tablet carried by the person. The communication device may also be a communication device installed in an object such as for example a car, motorbike or any other vehicle. Alternatively, this first location trajectory 3 may also be obtained by a computer algorithm that autonomously selects a moving object 18 from the camera feed or first location trajectories 14. The selecting may then be based on pre-configured behaviour rules, for example as described in "Intuitive Network Applications: Learning User Context and Behavior" by Nilton Bila et al published in Bell Labs Technical Journal, 2008.

The first party 1 then sends 9 the first location trajectory 3 to a second party 2. This second party can map location data it receives from the first party 1 onto one or more unique device identifiers of a communication device 17 associated with the moving object 16. The second party 2 then relays the first party's message to the communication device 17 without revealing the true identity of either the communication device 17 or the owner of the communication device. This mapping and relaying may be done in different ways depending on the platform the second party is using or operating.

According to a first preferred embodiment, the second party is a cellular network operator operating in the same public area 20 as the first party 1. The public area 20 is then largely covered by overlapping network cells 13 defined by the antennas operated by the cellular network operator. The communication devices 19 are then detectable by the network cells 13 and the network operator is able to get identification information from the devices connected to one of the cells. If a device is connected to one of the cells, the network operator can also send a message such as an SMS or MMS to one of the connected communication devices.

The network operator will then obtain 8 a set of second location trajectories 6 from devices that are connected to one of the cells 13 by obtaining location coordinates or points of the communication devices at different moments in time. Different solutions exist for obtaining a location of a communication device connected to a cellular network cell.

One way for obtaining a location is by using cell triangulation. This known technique uses the travel time of a signal from a communication device 19 to one or more antennas of one or more cells 13. Depending on the amount of antennas the communication device is communicating with, the position of the communication device can be determined with some degree of accuracy.

Another way for obtaining a location is by using the cell id or cell identification number. In this case, the location of the communication device 19 is considered to be the position of the cell the communication device is connected to. The accuracy is then dependent of the size of the cell and it is therefore advantageous to use small cells, for example cells operated by lightRadio cubes as described in http://www.alcatel-lucent.com/solutions/lightradio. For obtaining the position of the cell and thus the position of the communication device, the Google's Geolocation API may be used.

Detailed techniques to obtain a location of a connected communication device that may be used are described in "Wireless sensor network localization techniques" by Guoqiang Mao et al. published in The International Journal of Computer and Telecommunications Networking, Volume 51, Issue 10, Pages 2529-2553 on July, 2007.

The cellular network operator then compares the first location trajectory 3 received from the first party 1 with the set of second location trajectories 6 of communication devices connected to the network cells 13. If the network operator finds a second location trajectory, i.e. a selected location trajectory 5, that is substantially the same as the first location trajectory, it is assumed that the communication device 17 of this selected location trajectory is associated with the moving object 16 travelling the first location trajectory 3.

The cellular network provider then notifies 10 the first party that a location trajectory 5 has been found that matches the first location trajectory 3. The first party 1 then sends the message to the network provider who, on its turn, sends the message to the communication device 17. As, in this case, the second party 2 is a cellular network provider, the message is delivered by cellular communication means, for example by an SMS, MMS or the like. The sending of this notification may be optional. The message may also be send to the cellular network provider together with the sending 9 of the first location trajectory. The cellular network provider then directly sends the message to the selected communication device 17 without notifying the first party.

According to an alternative embodiment, the second party 2 may also be a location-based service. In this case the location of the communication devices 17 is collected by the communication devices themselves, for example by collecting GPS coordinates from a GPS module in the communication device. The communication device then forwards the location to the location-based service, i.e. to a server operated by the location-based service. The collecting and forwarding of the location points may be done by an application installed on the communication device and provided by the location-based service. The location-based service then collects all location points or coordinates from the communication devices subscribed to the location-based service and obtains a set of location trajectories 6 of the communication devices 19. The location-based service then obtains the selected location trajectory in a similar way as done by the cellular network provider described above.

As the users of the communication device 17 is subscribed to the location-based service, also his identification information for sending a message is known to the location-based service. This information may for example be a phone number or email address. The advantage of using a location-based service for the obtaining of the trajectories and the sending of the message to the communication device is that it can work over several wireless communication technologies. The location-based service may exchange the location information with the communication device over a cellular network, but also over WiFi or any other wireless network. The selection of the communication device from the set of the location trajectories is then performed in a similar way as for the cellular network operator. In the end, the location-based service sends the message to the communication device using the identification information.

According to a further alternative embodiment, the second party 2 may be any cell-based wireless network operator, for example an operator of a WiFi network comprising hot-spots. Similarly to the embodiment where the second party is a cellular network operator, the communication devices are then connected to cells 13 defined by the range of the hot spots. The location of the communication devices 19 may then be obtained by the location of the WiFi hot spot or, if supported, by techniques similar to cell triangulation for cellular networks. The wireless network operator then obtains the addressing information of the communication device when it registers to the hot-spot by requesting an email address or phone number when a user of a communication device subscribes to the internet service offered by the wireless network operator.

In the above embodiments the sending 9 of the first location trajectory 3 has been described as a static process where the first party 1 collects a predefined number of {location coordinate, timestamp} pairs and sends it to the second party 2. If a match is found by the second party 2, the message is delivered. Alternatively, this sending may also be done in a dynamic way where the first party 1 sends a live stream of {location coordinate, timestamp} pairs of a moving object. The second party then re-performs the comparing with the trajectories 6 until a match is found.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfill the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A method for identifying a communication device associated with a moving object, the method comprising:
   receiving from a first party, a first location trajectory of the moving object by a second party, wherein the first party does not know the identity of the moving object;
   obtaining a set of location trajectories of tracked communication devices by the second party;
   comparing the first location trajectory with location trajectories from the set by the second party;
   selecting a second location trajectory of a communication device from the set upon determining that the second location trajectory is substantially the same as the first location trajectory, by the second party;
   associating the communication device with the moving object, wherein the communication device and the moving object are physically attached to each other.

2. The method of claim 1, wherein the first location trajectory is determined by a camera grid.

3. The method of claim 1, further comprising:
   determining the set of location trajectories of tracked communication devices by cell-based communication networks by the second party.

4. The method of claim 1, further comprising:
   receiving location points of the tracked communication devices from the tracked communication devices by the second party.

5. The method of claim 1, further comprising:
   retrieving addressing information of the communication device.

6. The method of claim 5, wherein the second party is a location-based service operator and the addressing information is received when the communication device is subscribed to the second party.

7. The method of claim 5, further comprising:
   sending a first message to the communication device using the addressing information.

8. The method of claim 1, wherein the moving object is a vehicle.

9. The method of claim 2, wherein the camera grid is carried by drones.

10. The method of claim 5, further comprising:
    receiving a second message from the first party by the second party;
    relaying the second message to the communication device using the addressing information.

* * * * *